United States Patent [19]
Ishikawa

[11] Patent Number: 5,735,049
[45] Date of Patent: Apr. 7, 1998

[54] MOWING NYLON CUTTER AND MOWING MACHINE

[75] Inventor: Yoshiaki Ishikawa, Higashiosaka, Japan

[73] Assignee: Taiseikozai Co., Ltd., Osaka-fu, Japan

[21] Appl. No.: 787,317

[22] Filed: Jan. 24, 1997

[30] Foreign Application Priority Data

Oct. 7, 1996 [JP] Japan ................................. 8-302328

[51] Int. Cl.$^6$ ....................................................... B26B 7/00
[52] U.S. Cl. ............................ 30/276; 30/347; 56/12.7
[58] Field of Search ......................... 30/276, 347; 56/12.7,
56/289, 294; 428/357, 368, 373, 375, 378, 396

[56] References Cited

U.S. PATENT DOCUMENTS 4,054,993  10/1977  Kamp et al. ............................ 30/276
5,524,350   6/1996  Boland ................................... 30/347

FOREIGN PATENT DOCUMENTS 43-10291  4/1968  Japan .
43-10292  4/1968  Japan .

*Primary Examiner*—Hwei-Siu Payer
*Attorney, Agent, or Firm*—Evenson, McKeown, Edwards & Lenahan, P.L.L.C.

[57] ABSTRACT

In a mowing nylon cutter comprising a nylon cord, the nylon cord holds agricultural chemicals. The nylon cord is formed, for example, in such a manner that a nylon and a crystal technical product of agricultural chemicals are mixed and the mixture is extruded. When this nylon cutter is used, the agricultural chemicals held in the nylon cutter directly contact with and adhere to stalks remaining after the weeds are mowed simultaneously with the mowing of weed. Namely, the agricultural chemicals can be applied effectively simultaneously with mowing.

8 Claims, 2 Drawing Sheets

MOWING NYLON CUTTER AND MOWING MACHINE

BACKGROUND OF THE INVENTION

This invention relates to a mowing nylon cutter which rotates in a mowing machine at high speed to mow weeds and a mowing machine to which is attached the mowing nylon cutter.

In recent years, mowing is generally carried out by using a mowing machine. The mowing machine is designed to mow weeds by rotating a metal blade or a nylon cutter at high speed. However, the weeds grow fast even when it is mowed by the mowing machine because the mowing does not reach the to roots of the weeds. Therefore, it has been necessary to mow frequently.

In order to save this troublesome work, there is a method wherein agricultural chemicals such as weed killer etc. are scattered after mowing to kill the weeds at their roots. However, it has been necessary to carry out the mowing work and the scattering work separately, so that this method has cost much labor and has been uneconomical because of a large quantity of agricultural chemicals required. In addition, the desired effect can not be obtained unless the agricultural chemicals are scattered uniformly, so that the scattering work has required skill to some extent.

In order to overcome the disadvantage of the prior art, mowing machines described below have been proposed (Japanese Examined Patent Published Application (Kokoko) No. 43-10291 and Japanese Examined Patent Published Application (Kokoko) No. 43-10292). In these mowing machines, a rotary shaft of a rotary blade is made hollow, agricultural chemical solution is supplied to the hollow portion, and the agricultural chemical solution is discharged from radial passages formed between a holding metal of the rotary shaft and the rotary blade.

It has been difficult to sell the mowing machine having the above construction because its structure is complicated and uniform scattering of agricultural chemicals is difficult.

For this reason, it has long been desired to develop a mowing machine which does not consume the agricultural chemicals more than required, and which is able to dispense agricultural chemicals at the roots of the weed at the same time with mowing and is excellent in economy and safety.

BRIEF SUMMARY OF THE INVENTION

A first object of this invention is to provide a mowing nylon cutter which is able to apply agricultural chemicals to the roots of a weed at the same time with mowing when used for a mowing machine, thereby an effective use of agricultural chemicals can be realized, the frequency of mowing can be reduced, a use of agricultural chemicals can be lessened and its safety can be improved.

A second object of this invention is to provide a mowing machine which can realize the first object.

The mowing nylon cutter of this invention comprises a nylon cord and is characterized in that this cord holds agricultural chemicals.

The following constructions may be employed for holding the agricultural chemicals.

(1) The nylon cord is formed in such a manner that a nylon and a crystal technical product of agricultural chemicals are mixed and the mixture is extruded.

(2) The nylon cord holds agricultural chemical in solvent by impregnating the chemical under vacuum into plural hollow portions formed in the inside of the filament.

(3) A surface of the nylon cord is coated with agricultural chemicals. To carry out this coating, there are two methods: applying and annealing.

For the agricultural chemicals; bactericide, insecticides, a mixture of a bactericide and an insecticide, weed killers, plant growth regulators, rodenticides, attractants, repellants or spreader may be used, for example. However, the agricultural chemicals are not limited to these agents. When agricultural chemicals for killing specific types of weeds are used, only the specific weed is killed. Then, the mowing work can be done efficiently.

The mowing machine of this invention is one which mows weeds by rotating the mowing nylon cutter comprising the nylon cord at high speed, and is characterized in that the nylon cord holds the agricultural chemicals.

When the mowing nylon cutter of this invention is rotated at high speed in the mowing machine to mow the weeds, agricultural chemicals held by the nylon cutter adhere directly to the stalks remaining after the weeds are mowed. Thereby, the following effects can be obtained.

(1) The agricultural chemicals can be applied simultaneously with mowing the weeds, so that workability can be improved as compared with the conventional method wherein the mowing is carried out independently from the scattering. Further, the worker is not required to be skilled.

(2) The effect of agricultural chemicals, for example, the effect of killing or growth inhibiting safely exerted on the weed. Thereby, the effective use of agricultural chemicals can be realized and the frequency of mowing can be reduced. For example, the frequency of weed mowing work can be reduced to about once a year.

(3) The agricultural chemicals adhere only to the stalks of unmowed roots of weeds, so that the use of agricultural chemicals can be lessened.

(4) The agricultural chemicals can be prevented from being scattered to useful plants growing in the vicinity of weeds to be mowed.

(5) The agricultural chemicals can be prevented from being scattered to the worker, so that the safety of mowing can be improved.

(6) The nylon cutter rotates at a speed higher than 6,000 rpm., so that its tip end is worn out at a rate of 4 cm to 5 cm per 15 minutes. Therefore, the agricultural chemicals mixed or impregnated in the nylon cutter always contact with the weed under a not-deteriorated or new state. Accordingly, the effect of the agricultural chemicals can be maintained at a high grade.

DETAILED DESCRIPTION OF THE INVENTION

Embodiment 1

Figure 1:
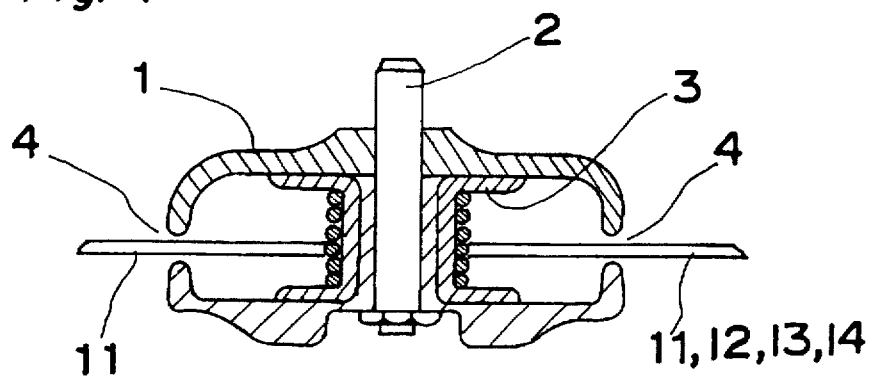
FIG. 1 is a sectional view of an essential part of the mowing machine of this invention.

FIG. 1 is a sectional view of an essential part of the mowing machine of this invention. A transmission shaft 2 is rotatably installed at the center of a housing 1 attached to a tip end of a support arm (not shown). A reel 3 rotating integrally with the transmission shaft 2 is secured to a peripheral surface of the transmission shaft 2 in the housing 1. A flexible nylon cutter 11 is wound around the reel 3, and a free end of the nylon cutter 11 is pulled outside from a piercing groove 4 formed on a peripheral wall of the housing 1 in a circumferential direction. This part pulled outside serves as the cutter.

Figure 2:
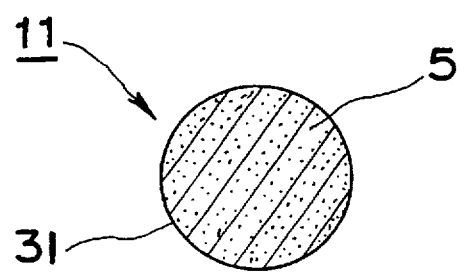
FIG. 2 is a sectional view of the mowing nylon cutter of a first embodiment.

FIG. 2 is the sectional view of the nylon cutter 11. The nylon cutter 11 of this embodiment is composed of a nylon cord 31. The nylon cord 31 is formed in such a manner that a nylon 66 and a crystal technical product of agricultural chemicals 5 are mixed and the mixture is extruded. Accordingly, the agricultural chemicals 5 are mixed in the nylon cord 31 as shown in FIG. 2. In other words, the nylon cord 31 holds agricultural chemicals 5.

When the nylon cutter 11 having the above-mentioned structure is rotated at high speed in the mowing machine to mow the weeds, the nylon cutter 11 is gradually worn out simultaneously with the mowing of the weeds. Thus, the mixed-in agricultural chemicals 5 come outside and the agricultural chemicals 5 directly contact with and adhere to the stalks remaining after the weeds are mowed. Thereby, the following effects can be obtained.

(1) The agricultural chemicals 5 can be applied simultaneously with mowing of the weeds, so that the workability can be improved as compared with the conventional method wherein the mowing is carried out independently from the scattering. Further, the worker is not required to be skilled.

(2) Effect of agricultural chemicals 5, for example, effect of killing or growth inhibiting can be safely exerted on the weed. Thereby, the effective use of agricultural chemicals can be realized and the frequency of mowing can be reduced. For example, the frequency of weed mowing can be reduced to about once a year.

(3) The agricultural chemicals 5 adhere only to the stalks remaining after the weeds are mowed, so that the use of agricultural chemicals can be lessened.

(4) The agricultural chemicals 5 can be prevented from being scattered to useful plants growing in the vicinity of weeds to be mowed.

(5) The agricultural chemicals 5 can be prevented from being scattered to the worker, so that the safety of mowing can be improved.

(6) The nylon cutter 11 rotates at a speed higher than 6,000 rpm., so that its tip end is worn out at a rate of 4 cm to 5 cm per 15 minutes. Therefore, the agricultural chemicals 5 mixed or impregnated in the nylon cutter 11 always contact with the weed under a not-deteriorated or new state. Accordingly, effect of the agricultural chemicals 5 can be maintained at a high grade.

Embodiment 2

Figure 3:
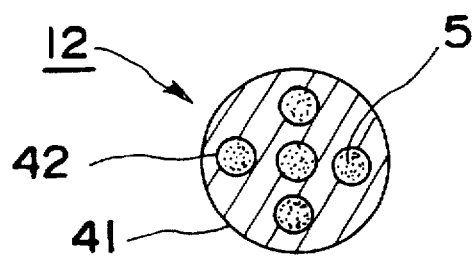
FIG. 3 is a sectional view of the mowing nylon cutter of a second embodiment.

FIG. 3 is a sectional view of the flexible nylon cutter 12 of this embodiment. This nylon cutter 12 is formed in such a manner that fine-tube-shaped hollow portions 42 having a diameter of about 0.3 mm are formed in a nylon cord 41 having a diameter of about 3 mm and made of a nylon 66, and a solution of the agricultural chemicals 5 is impregnated under vacuum in the hollow portions 42. Namely, the nylon cord 41 holds the agricultural chemicals 5. In this case, the hollow portion 42 may be continuous or intermittent along the nylon cord 41.

Even when the nylon cutter 12 having the above structure is used in the mowing machine of FIG. 1, the nylon cutter 12 is gradually worn out simultaneously with the mowing of the weeds. Thus, the mixed-in agricultural chemicals 5 come outside and the agricultural chemicals 5 directly contact with and adhere to the stalks remaining after the weeds are mowed. Accordingly, effects the same as embodiment 1 can be obtained.

Embodiment 3

Figure 4:
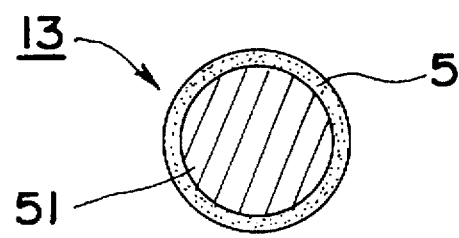
FIG. 4 is a sectional view of the mowing nylon cutter of a third embodiment.

FIG. 4 is a sectional view of the flexible nylon cutter 13 of this embodiment. This nylon cutter 13 is formed by coating the agricultural chemicals 5 on a peripheral surface of a nylon cord 51 made of nylon 66. Namely, the nylon cord 51 holds the agricultural chemicals 5.

Even when the nylon cutter 13 having the above structure is used in the mowing machine of FIG. 1, the agricultural chemicals 5 coated on the nylon cord 51 directly contact with and adhere to the stalks remaining after the weeds are mowed simultaneously with the mowing. Accordingly, effects which are the same as those of embodiment 1 can be obtained.

Embodiment 4

Figure 5:
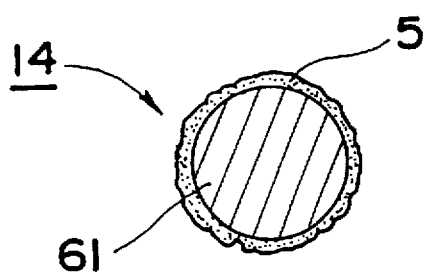
FIG. 5 is a sectional view of the mowing nylon cutter of a fourth embodiment.

FIG. 5 is a sectional view of the flexible nylon cutter 14 of this embodiment. This nylon cutter 14 is formed by coating the agricultural chemicals 5 on a peripheral surface of a nylon cord 61 made of a nylon 66. Namely, the nylon cord 61 holds the agricultural chemicals 5. However, this coating is carried out by annealing the agricultural chemical solution on the nylon cord 61.

Even when the nylon cutter 14 having the above structure is used in the mowing machine of FIG. 1, the agricultural chemicals 5 coated on the nylon cord 61 directly contact with and adhere to the stalks remaining after the weeds are mowed simultaneously with the mowing. Accordingly, effects which are the same as those of embodiment 1 can be obtained.

I claim:

1. A mowing machine for mowing weeds comprising a mowing nylon cutter to be rotated at high speed, said nylon cutter comprising a nylon cord, and agricultural chemicals.

2. A mowing nylon cutter comprising a nylon cord and agricultural chemicals.

3. A mowing nylon cutter as defined in claim 1, wherein said cord is formed of nylon, said agricultural chemicals are of a crystal technical product, and said cutter is formed by mixing and then extruding the nylon and the crystal technical product.

4. A mowing nylon cutter as defined in claim 1, wherein said nylon cord comprises a plurality of hollow portions formed therein containing an agricultural chemical solution, said agricultural chemical solution having been impregnated in said hollow portions under vacuum.

5. A mowing nylon cutter as defined in claim 1, in which the agricultural chemicals are carried on a surface of the nylon cord.

6. A mowing nylon cutter as defined in claim 5, in which the agricultural chemicals are applied by coating the same on the surface of the nylon cord.

7. A mowing nylon cutter as defined in claim 5, in which the agricultural chemicals are applied to the surface of the nylon cord by annealing.

8. A mowing nylon cutter as defined in claim 1, wherein the agricultural chemicals are selected from the group consisting of bactericide, insecticide, weed killer, plant growth regulator, rodenticide, attractant, repellent, spreader, and mixtures thereof.

* * * * *